United States Patent [19]

McGarry

[11] Patent Number: 6,154,567
[45] Date of Patent: Nov. 28, 2000

[54] PATTERN SIMILARITY METRIC FOR IMAGE SEARCH, REGISTRATION, AND COMPARISON

[75] Inventor: E. John McGarry, Tigard, Oreg.

[73] Assignee: Cognex Corporation, Natick, Mass.

[21] Appl. No.: 09/108,279

[22] Filed: Jul. 1, 1998

[51] Int. Cl.[7] ...................................................... G06K 9/00
[52] U.S. Cl. ............................................. 382/219; 382/209
[58] Field of Search .................................. 382/219, 222, 382/221, 229, 209; 364/552, 488, 150, 578

[56] References Cited

U.S. PATENT DOCUMENTS

| | | |
|---|---|---|
| 3,069,654 | 12/1962 | Hough . |
| 3,936,800 | 2/1976 | Ejiri et al. . |
| 4,200,861 | 4/1980 | Hubach et al. . |
| 4,441,206 | 4/1984 | Kuniyoshi et al. . |
| 4,567,610 | 1/1986 | McConnell . |
| 4,637,055 | 1/1987 | Taylor . |
| 4,651,341 | 3/1987 | Nakashima et al. . |
| 4,672,676 | 6/1987 | Linger . |
| 4,736,437 | 4/1988 | Sacks et al. . |
| 4,783,829 | 11/1988 | Miyakawa et al. . |
| 4,797,842 | 1/1989 | Nackman et al. ........................ 364/578 |
| 4,799,175 | 1/1989 | Sano et al. . |
| 4,823,394 | 4/1989 | Berkin et al. . |
| 4,843,631 | 6/1989 | Steinpichler et al. . |
| 4,955,062 | 9/1990 | Terui . |
| 5,046,109 | 9/1991 | Fujimori et al. . |
| 5,048,094 | 9/1991 | Aoyama et al. . |
| 5,168,530 | 12/1992 | Peregrim et al. . |
| 5,216,752 | 6/1993 | Tam ........................................... 395/27 |
| 5,253,306 | 10/1993 | Nishio . |
| 5,313,532 | 5/1994 | Harvey et al. . |
| 5,347,595 | 9/1994 | Bokser . |
| 5,384,711 | 1/1995 | Kanai et al. . |
| 5,481,712 | 1/1996 | Silver et al. . |
| 5,495,537 | 2/1996 | Bedrosian et al. . |
| 5,537,669 | 7/1996 | Evans et al. . |
| 5,568,563 | 10/1996 | Tanaka et al. . |
| 5,586,058 | 12/1996 | Aloni et al. ............................... 364/552 |
| 5,602,937 | 2/1997 | Bedrosian et al. . |
| 5,657,403 | 8/1997 | Wolff et al. . |
| 5,717,785 | 2/1998 | Silver . |
| 5,809,171 | 9/1998 | Neff et al. ................................. 382/209 |
| 5,835,634 | 11/1998 | Abrams ..................................... 382/222 |
| 5,974,228 | 10/1999 | Heitsch ..................................... 395/109 |

OTHER PUBLICATIONS

Ballard, D.H., "Generalizing the Hough Transform to Detect Arbitrary Shapes," *Patter Recognition*, 1981, pp. 111–122, vol. 13, No. 2, Pergamon Press Ltd., UK.

Ballard, et al., "Section 4.2 Searching Near and Approximate Location," and "Section 4.3 The Hough Method for Curve Detection," *Computer Vision*, 1982, pp. 121–131, Prentice–Hall, Inc., Englewood Cliffs, NJ, USA.

Brown, Lisa Gottesfeld, "A Survey of Image Registration Techniques," *ACM Computing Surveys*, Dec. 1992, pp. 325–376, vol. 24, No. 4, Association for Computing Machinery, USA.

Caelli, et al., "Fast Edge–Only Matching Techniques for Robot Pattern Recognition," *Computer Vision, Graphics, and Image Processing 39*, 1987, pp. 131–143, Academic Press, Inc.

(List continued on next page.)

*Primary Examiner*—Bijan Tadayon
*Assistant Examiner*—Seyed H. Azarian
*Attorney, Agent, or Firm*—Russ Weinzimmer

[57] ABSTRACT

The present invention provides a method for the calculation of a pattern similarity metric that is locally normalized with respect to illumination intensity, and is invariant with respect to rigid body preserving gray scale variations, such as scale, rotation, translation, and non-linear intensity transformations. In one aspect, the invention provides a method for comparing a model image with a run-time image so as to provide a quantitative measure of image similarity. In another general aspect of the invention, a method is provided for searching a run-time image with a model image so as to provide at least one location of the model image within the run-time image.

19 Claims, 7 Drawing Sheets

OTHER PUBLICATIONS

Caelli, et al., "On the Minimum Number of Templates Required for Shift, Rotation and Size Invariant Pattern Recognition," *Pattern Recognition*, 1988, pp. 205–216, vol. 21, No. 3, Pergamon Press plc.

Cognex Corporation, "Chapter 2 Searching," *Cognex 2000/3000/4000 Vision Tools*, 1992, pp. 2–1 to 2–62, Revision 5.2 P/N 590–0103, Natick, MA, USA.

Cognex Corporation, "Chapter 1 Searching," *Cognex 3000/4000/5000 Programmable Vision Engines, Vision Tools*, 1996, pp. 1–68, Revision 7.4 590–1036, Natick, MA, USA.

Cognex Corporation, "Chapter 14 Golden Template Comparison," *Cognex 3000/4000/5000 Programmable Vision Engines, Vision Tools*, 1996, pp. 569–595, Revision 7.4 590–1036, Natick, MA, USA.

Crouzil, et al., "A New Correlation Criterion Based on Gradient Fields Similarity," *Proceedings of the 13th International Conference on Pattern Recognition vol. I Track A: Computer Vision*, Aug. 25–29, 1996, pp. 632–636, IEEE Computer Society Press, Los Alamitos, CA, USA.

Grimson et al., "On the Sensitivity of the Hough Transform for Object Recognition," *IEEE Transactions on Pattern Analysis and Machine Intelligence*, Mar. 1990, pp. 255–274, vol. 12. No. 3.

Hsieh et al., "Image Registration Using a New Edge–Based Approach," *Computer Vision and Image Understanding*, Aug. 1997, pp. 112–130, vol. 67, No. 2, Academic Press.

Rosenfeld et al., "Coarse–Fine Template Matching," *IEEE Transactions on Systems, Man, and Cybernetics*, Feb. 1997, pp. 104–107, USA.

Cognex Corporation, "Description of Sobel Search," Natick, MA, USA, 1998 but public before the above–referenced filing date.

Tian et al., "Algorithms for Subpixel Registration," *Computer Vision, Graphics, and Image Processing 35*, 1986, pp. 220–233, Academic Press, Inc.

PATTERN SIMILARITY METRIC FOR IMAGE SEARCH, REGISTRATION, AND COMPARISON

FIELD OF THE INVENTION

This invention relates to image analysis, and particularly to searching for, locating, and evaluating a pattern in an image.

BACKGROUND OF THE INVENTION

The field of pattern recognition for the purpose of image alignment, inspection and verification has wide application in industry. For example, in the highly automated fabrication of integrated circuits, many manufacturing processes demand the accurate optical registration of circuit patterns as a prerequisite step.

It is known that the gray scale characteristics of an image of a scene can change as a result of complex parameters related to variability of both the illumination source, and as a result of the optical characteristics of the material in the field of view. Some of these parameters are relatively easy to predict and model mathematically. It is known, for example, that invariance to global linear intensity variation can be provided by use of a gray scale normalized correlation image similarity metric. Likewise, the Generalized Hough Transform (GHT), which is based on the accumulation of a count of matching edge gradient direction, is known to provide intensity normalization on a pixel neighborhood basis. Syntactic analysis groups local neighborhood computed edge gradient features into high-level components, such as lines, corners, and arc segments, to construct a graph-like data structure that is used to search for a best-match pattern consistent with the model syntax.

Each of the aforementioned techniques has advantages and disadvantages. Normalized correlation metric search is easy to train and it can be efficiently implemented on inexpensive high-speed hardware, but it suffers from the inability to generalize beyond simple linear intensity variation. Generalized Hough Transform search is substantially invariant to non-linear gray scale image variation, but GHT tends to over-generalize. Additionally, the GHT method requires a computationally expensive pre-processing step to compute edge magnitude and direction information, and a large high-speed memory array to accommodate the fan-out nature of the accumulation algorithm. Syntactic approaches typically require a high degree of supervision during the training process, and are in general too complex for practical applications in, for example, semiconductor test equipment.

SUMMARY OF THE INVENTION

The present invention relates primarily to the extraction and calculation of a pattern similarity metric that is locally normalized with respect to illumination intensity, and is invariant with respect to rigid body preserving gray scale variations, such as scale, rotation, translation, and non-linear intensity transformations.

In one aspect, the invention provides a method for comparing a model image with a run-time image so as to provide a quantitative measure of image similarity. At train-time, the method includes the steps of extracting sample pixels of the model image so as to provide a pixel position and a gray value for each sample pixel of the model image. Then, gray value differences are computed between overlapping pairs of sample pixels of the model image. Next, a compact binary representation is computed for each overlapping pair, and then an expanded binary representation is computed for each compact binary representation. Next, a corresponding pixel position is associated with each expanded binary representation to provide a model element, and then all model elements are grouped together to provide a model. At run-time, gray values are determined at a plurality of selected pixel locations in a run-time image in accordance with pixel positions of the elements of the model. Then, gray value differences are computed between overlapping pairs of the selected pixels of the run-time image, a compact binary representation is computed for each overlapping pair of the selected pixels of the run-time image, and a run-time bit-expanded representation is computed for each run-time compact binary representation. Then, each run-time bit-expanded representation is compared with a corresponding model bit-expanded representation to provide a match count increment, and all match count increments are combined to provide a total match value.

In a preferred embodiment, extracting sample pixels of the model image includes finding zero-crossings of the gray-scale second derivative of the model image. Also, extracting sample pixels of the model image can include extracting sample pixels in a random pattern. Alternatively, extracting sample pixels of the model image can include extracting sample pixels in a biased random pattern. In a preferred embodiment, extracting sample pixels of the model image includes extracting sequences of sample pixels from alternating sides of a curve derived from the model image.

In a further preferred embodiment, after computing the expanded binary representation for each compact binary representation, a perturbed expanded binary representation is computed for each compact representation. Then, the perturbed expanded binary representation is combined with the corresponding expanded binary representation. In the aspect of the invention related to searching, a search strategy is associated with the model, and/or normalizing information is associated with the model.

In a preferred embodiment, the step of determining gray values at a plurality of selected locations in a run-time image includes adding an image offset to the coordinate portion of each element of the model.

In an alternate preferred embodiment, the step of determining gray values at a plurality of selected locations in a run-time image includes transforming the coordinate portion of each element of the model, where the selected locations in the run-time image are determined by the coordinates so-transformed.

Preferably, the train-time step and/or the run-time step of computing a compact binary representation includes computing a 3-bit representation, although other size representations may be desirable.

In a preferred embodiment, the step of comparing each run-time bit-expanded representation with a corresponding model bit-expanded representation to provide a match count increment includes, for each bit of a bit-expanded code word, if both corresponding bits are equal to one, providing a match count increment, else, not providing a match count increment.

In a further preferred embodiment, an additional condition is imposed: providing a match count increment only when $|\Delta_{i+1}|+|\Delta_i|$ is greater than a threshold, else, not providing a match count increment. The threshold can be equal to 1.

In a further preferred embodiment, an additional condition is imposed: a match count increment is provided only if the condition "both corresponding bits are equal to one" has been satisfied over at least one previous match of a run-time bit-expanded representation with a corresponding model bit-expanded representation.

In an alternate embodiment, a match count increment is subtracted whenever the phase angle of the model bit-expanded code is 180 degrees out of phase with respect to the phase angle of the corresponding run-time image bit-expanded code.

In another general aspect of the invention, a method is provided for searching a run-time image with a model image so as to provide at least one location of the model image within the run-time image including determining a plurality of total match values at a plurality of positions in the run-time image to provide a total match value space; and evaluating the total match value space so as to find local maxima.

The present invention combines many of the advantages of the prior art, yet tends to avoid most of the common disadvantages thereof. For example, like normalized correlation, it is easy to train a model for use with the similarity metric of the invention, and the similarity metric of the invention can be efficiently computed in inexpensive high-speed hardware. Like GHT, the similarity metric of the invention is substantially invariant to non-linear gray scale intensity variation. Like the syntactic approach, the similarity metric of the invention clusters edge segments such that higher-level features are accounted for in the metric.

BRIEF DESCRIPTION OF THE DRAWING

The invention will be more fully understood from the following detailed description, in conjunction with the accompanying figures, wherein.

DETAILED DESCRIPTION OF THE PREFERRED EMBODIMENTS

A primary aspect of the invention is a similarity metric, i.e., a method for quantifying the similarity of an image of a selected scene to an image of a model scene. Generally, the method of the invention extracts features of the image of the model scene to create a model. The model is then compared with the features extracted from the image of the selected scene in a quantitative way, i.e., a number is provided by the invention that indicates the extent of the similarity.

Thus, the invention can clearly be used to compare images. The invention can also be used to search an image for a model scene. This is essentially a repeated application of the similarity metric of the invention at various positions within the image to be searched for the model scene. Each position in the scene is assigned a similarity value; the position with the highest value is likely the location of the model scene within the image. Alternatively, if there are many instances of the model scene in the image, each location having a similarity value above a threshold may be the location of an instance of the model scene.

The arrangement of similarity values (also called match values, response values, match metric values) in a two-dimensional array corresponding to the image locations of the image being searched is called a response surface (or a match-metric surface). A local maximum in this surface can be an instance of the model scene in the image. Each image can have a plurality of instances of the model scene.

Further, the method of the invention can facilitate image registration by finding the position of the model scene with respect to the image being registered that maximizes the similarity metric.

For all uses of the invention, a model must first be generated, the model then being available for many later uses. Thus, the model is said to be created at "train-time", i.e., a model is trained. The model is then used at "run-time", e.g., the model can be used during the running of a process, such as image registration, image searching, or image similarity measurement.

Accordingly, the operation of the present invention can be divided into two principle phases: train-time and run-time.

Figure 1:
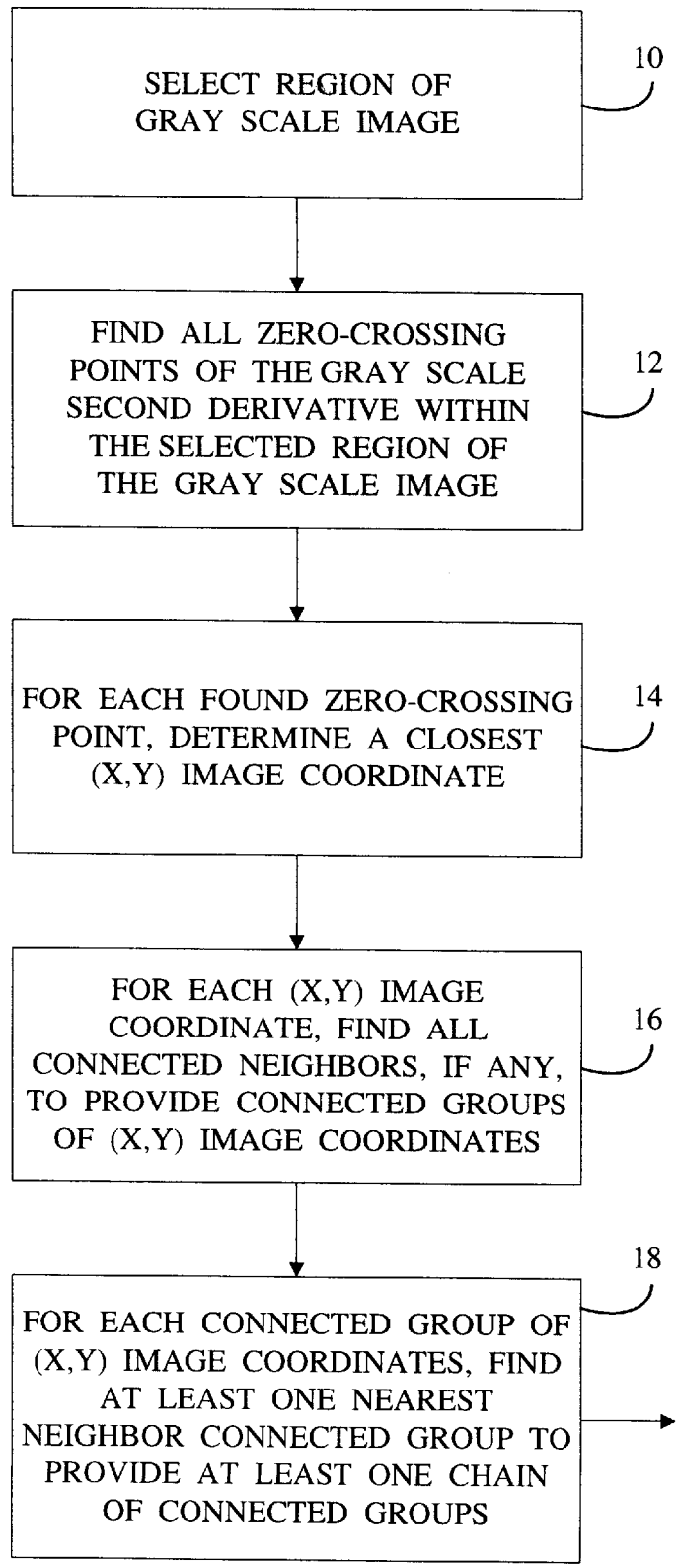
FIG. 1 is a flow chart showing a sequence of steps for to provide a chain of connected groups of zero-crossing points.

With reference to FIG. 1, at train-time, a region of a gray-scale image of a scene is selected 10. The image within the region is the image that will be used to create a model for use at run-time. In the following steps, features will be extracted from the image within the region, and then the features will be represented so as to facilitate comparing features of the model with the features extracted from an image of a scene to be compared therewith. Further, as recognized by the invention, it is possible to represent the features so as to facilitate the use of the model in image searching, registration, and comparison.

Figure 3:
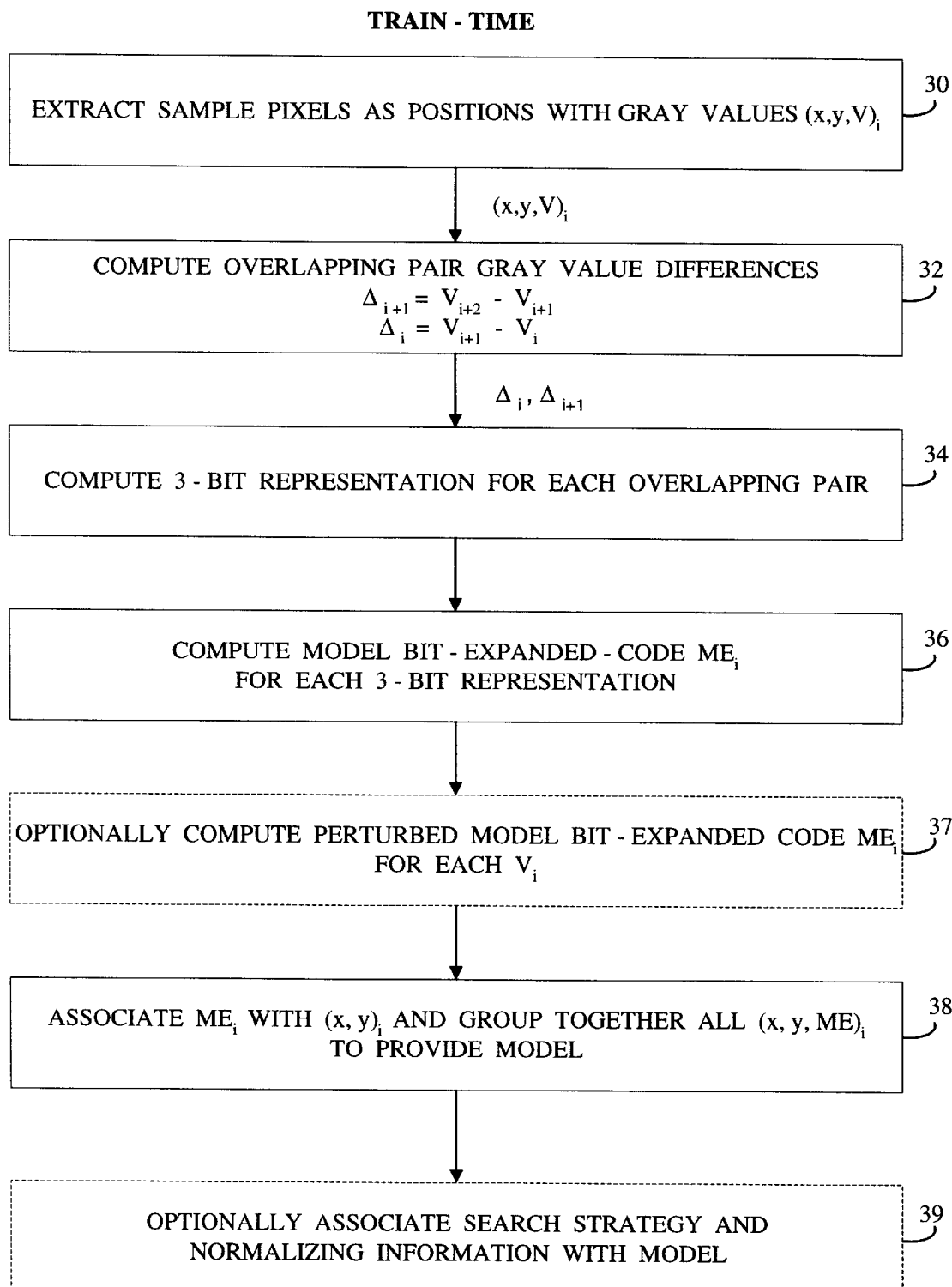
FIG. 3 is a flow chart showing the steps performed at train-time to provide a model according to the invention.

With reference to FIG. 3, in general, the invention requires that sample pixels (x, y, V)$_i$ be extracted 30 as image positions based on the coordinate system of the image, e.g., (x,y)$_i$, and the respective gray values V$_i$ at those positions. Extracting the sample pixels can be done in a variety of ways. They can be extracted at random, i.e., anywhere in the image without regard for the pixel values. Alternatively, they can be selected in accordance with a biased randomness. For example, first, a base probability is chosen based on the desired ratio of the number of sample pixels to the number of total pixels in the selected image. For example, a sampling ratio of 1 to 10 could be chosen. Next, the edge magnitude can be calculated at each point in the selected image, and that edge magnitude can be normalized such that it's value ranges between 0 and 1. Then, for each position in the selected image, the normalized edge magnitude is subtracted from 1 and the result is multiplied by the base probability to provide the probability that the pixel at that position would be extracted as a sample pixel.

Alternatively, there are a variety of approaches for extracting sample pixels that involve finding edge points in the selected image, connecting the edge points in some fashion, and then extracting sample pixels in relation to the connected edge points. For example, in a preferred embodiment, edge points can be found as zero-crossings 12 of a second derivative taken over the selected image region.

Alternatively, edge points can be found using a Sobel edge operator, for example. Any method for finding edge points would suffice.

Figure 4:
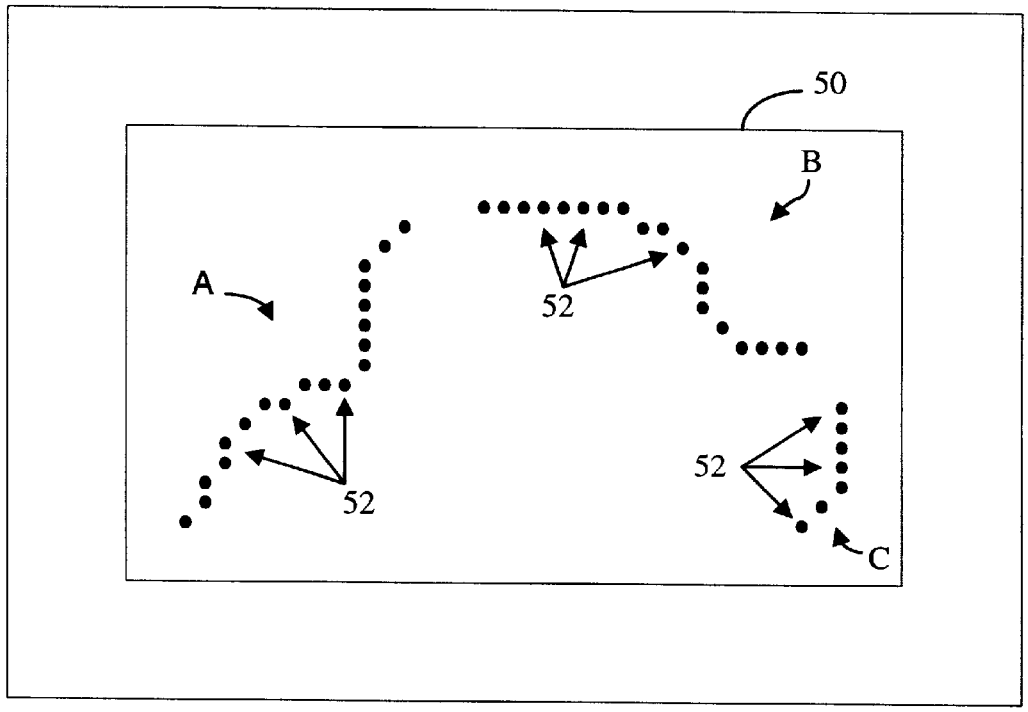
FIG. 4 is a graph showing a plurality of connected groups, and how they form a chain of connected groups.
Figure 5:
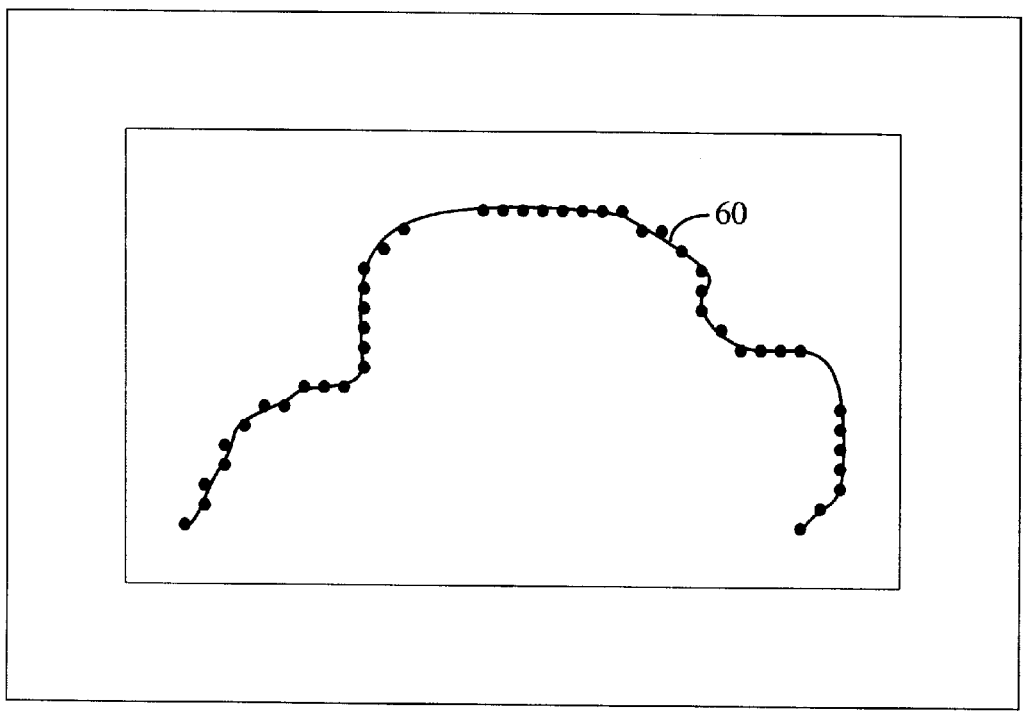
FIG. 5 is a graph showing how a chain of connected groups forms the basis for a curve fit thereto.

With reference to FIG. 4, in a preferred embodiment, after finding all zero-crossing points of the gray scale second derivative within the selected region 50 of the image 12, for each found zero-crossing point, a closest (x,y) image coordinate is found 14, such as those coordinate points 52 shown in FIG. 4. Next, for each (x,y) image coordinate point 52, all connected neighbors are found 16, if any, so as to provide connected groups A, B, C of (x,y) image coordinate points 52. A connected neighbor can be 0, 1, or 2 pixels away, along either a coordinate direction or along a diagonal.

Next, for each connected group A, B, C, of (x,y) image coordinates, at least one nearest neighbor connected group is found 18 so as to provide at least one chain of connected groups ABC, as shown in FIG. 4. A nearest neighbor connected group can be 0, 1, or 2 pixels away, along either a coordinate direction or along a diagonal.

Figure 2:
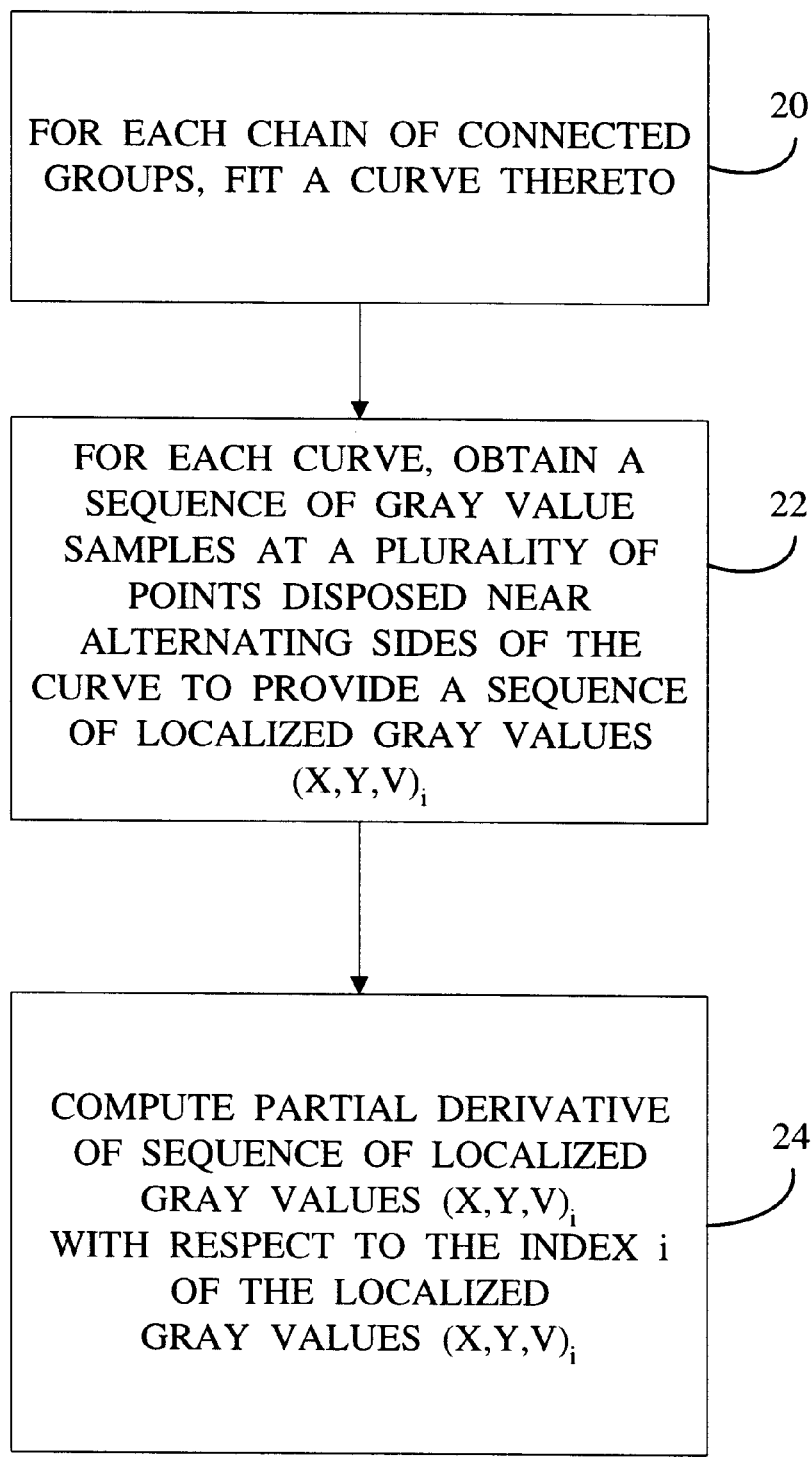
FIG. 2 is a flow chart showing a sequence of steps including a preferred step for extracting sample pixels as positions with gray values.
Figure 6:
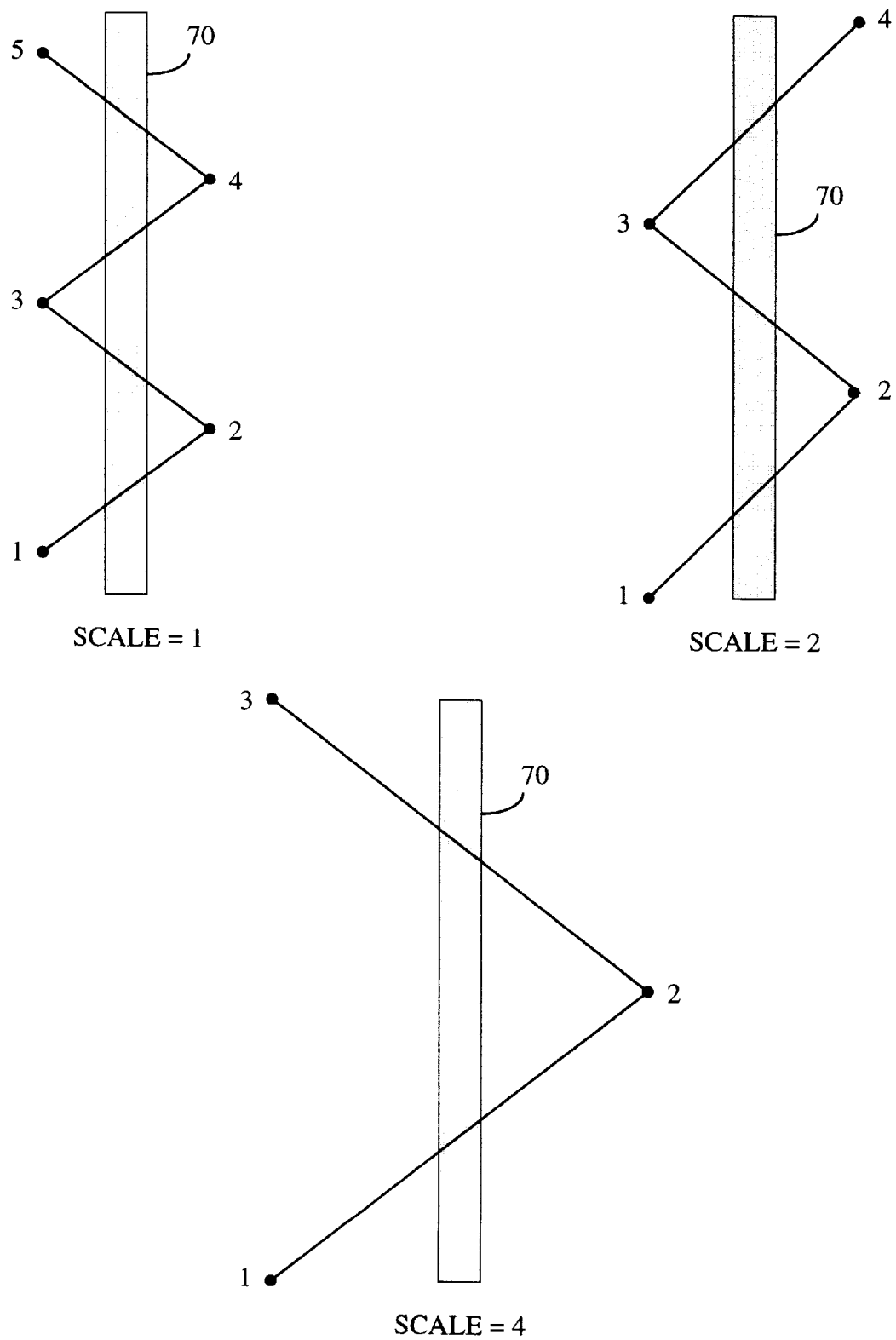
FIG. 6 is a pictorial illustration of a portion of the curve of FIG. 5, and the sequence of sample pixels extracted about the portion of the curve, at a plurality of scales.

Referring to FIGS. 2 and 6, for each chain of connected groups ABC, a curve 60 is fit thereto 20. This can also be done using any curve fitting method, or by boundary tracking, for example. Results can be stored in a shift register to preserve the order in which the points of the curve are acquired. Then, for each curve, sample pixels can be extracted as positions with gray values $(x,y,V)_i$, as in general step 30 of FIG. 3. There are many ways to extract sample pixels with respect to curves found in the sample image. In particular, as stated in step 22 of FIG. 2, for each curve, a sequence of gray value samples can be obtained at a plurality of points disposed near alternating sides of the curve to provide a sequence of localized gray values $(x,y,V)_i$. For example, FIG. 6 shows a sequence of points 1,2,3,4,5 extracted about a line of edge pixels 70 at scale=1.

FIG. 6 also illustrates that sample pixels can be extracted at a plurality of scales, for example at scales of 1, 2, and 4, so as to provide a multi-resolution similarity metric that provides intrinsically multi-resolution functionality. Thus, sample pixel data from a plurality of scales can be processed together simultaneously. By contrast, prior methods, such as multi-resolution normalized correlation, require that data for each scale be processed separately, and typically serially. Moreover, the method of the invention is more tolerant of scale variations, even if a single scale is processed, than prior methods such as normalized correlation.

Other sequences of points are possible and can provide similar information. For example, instead of a zig-zag pattern, a square-wave pattern can be followed providing two points on each side in an alternating fashion, instead of one point on each side in an alternating fashion, as in the zig-zag pattern.

Next, the sequences of points (or positions with gray values) are grouped into overlapping pairs 32. For example, referring to FIG. 6, the resulting overlapping pairs are (1,2) (2,3), (3,4), (4,5), . . . Then, overlapping-pair gray value differences $\Delta_1$ and $\Delta_2$ are computed: $\Delta_1 = V_2 - V_1$, $\Delta_2 = V_3 - V_2$, and so forth, where $V_i$ is the gray value for the point having index i. One way that this can be accomplished is to compute the partial derivative of the sequence of localized gray values $(x,y,V)_i$ with respect to the index i of the localized gray values $(x,y,V)_i$, as shown in step 24 of FIG. 2.

Referring again to FIG. 3, we next compute a compact binary representation, e.g., a 3-bit representation, of each overlapping pair. The first bit of the 3-bit representation is set to 1 if $\Delta_2$ is less than 0. Else, the first bit is set to 0. The second bit of the 3-bit representation is set to 1 if $\Delta_1$ is less than 0. Else, the second bit is set to 0. And the third bit of the 3-bit representation is set to 1 if $|\Delta_2|$ is greater than $|\Delta_1|$, else it is set to 0.

Figure 7:
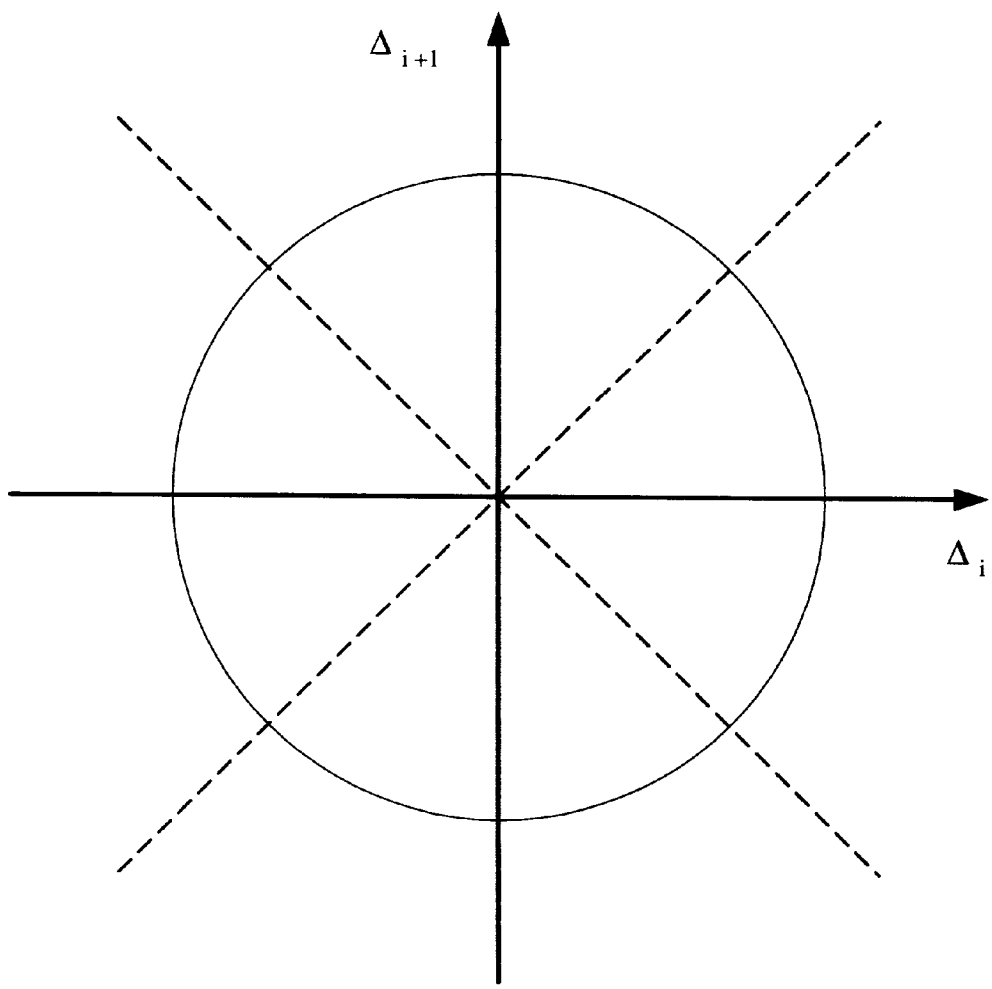
FIG. 7 is a coordinate system for illustrating phase angle and the eight octants of the eight possible phase angles.

Referring to FIG. 7, the 3-bit representation described herein can be interpreted as representing a phase angle, where the phase angle can assume one of eight values, each value being represented by a different 3-bit binary number. The phase angle is a feature of the image determined by the two overlapping pairs.

For additional phase angle precision, a fourth bit can be added that represents whether or not, for example, $|\Delta_{I+1}|$ is greater than $3|\Delta_I|$. Adding a fourth bit allows the phase angle to assume one of sixteen values, and divides the coordinate system of FIG. 7 into 16 equal-sized segments.

Note that many other 3-bit compact binary representations can be devised by one of average skill in the art, such as using $2^N/360 * \arctan(|\Delta_{I+1}|/|\Delta_I|)$. This approach can also yield 2-bit, 4-bit, 5-bit, and 6-bit compact binary representations, for example.

Also, more generally, there are many ways to represent N−1 overlapping pair gray-value differences, where N is the number of selected pixels in the N−1 overlapping pair gray-value differences. Here, N can be 2, 3, 4, 5, or 6, for example. Thus, if the run of pixels is 5 pixels long, there would be 4 overlapping pairs of gray-value differences, and this could be represented by a 32-bit compact binary representation. Alternatively, the 5-pixel run could be represented by a 16-bit, or a 64-bit representation, for example.

Next, a bit-expanded code $ME_i$ (M designates that this code is to be included in the model) is computed for each 3-bit binary number 36. In the case of a 3-bit binary number, an 8-bit expanded binary number is computed. Generally, the bit-expanded number is $2^c$, where C is the number of bits in the compact binary representation. For example, the binary number 101 becomes 0010000, the binary number 111 becomes 10000000, and the binary number 000 becomes 00000001.

Generally, a key aspect of the invention is to compute N overlapping edge pairs that are used to create a set of differences, the set being of any size, the differences then being used to construct a compact binary representation of C bits, which is then converted into an expanded representation of $2^c$ bits.

In a preferred embodiment, steps 32, 34, and 36 are repeated so as to compute a perturbed model bit-expanded code $ME_i$ for each $V_i$ 36. To do this, each overlapping pair has one of the gray values V independently and singly perturbed either by adding one or by subtracting one. Thus, steps 32, 34, and 36 must be repeated an additional eight times to independently and singly perturb each of the three gray values in an overlapping pair of gray values. The result is eight more bit expanded codes $ME_i$, and these are Ored with the unperturbed model bit-expanded code to provide a perturbed model bit-expanded code. An example might look like 00011100, where three types of bit expanded code (00010000, 00001000, 00000100) resulted from the perturbations, and the unperturbed model bit-bit expanded code looked like 00001000.

Each model bit-expanded code $ME_i$ (either perturbed or not perturbed) is associated with the position $(x,y)_i$ of the first element of the overlapping pair that resulted in the model bit-expanded code $ME_i$, to provide a model element $(x,y,ME)_i$. For example, each model element can be stored as a 32-bit word, nine bits for x, nine bits for y, eight bits for the bit-expanded code, with the remaining six bits usable for hardware control in some applications, or the remaining six bits may not be used in some software implementations. Note that the position (x,y) of the model element can be transformed by any affine transformation, such as rotation or scale, in a straightforward manner known to one skilled in the art. Also note that the bit-expanded code of the model element is invariant under any affine transformation. The model elements are grouped together over all i to provide the model according to the invention of the selected region.

When the model is used as part of an image search method, it is advantageous to associate a search strategy with the model, where the extraction step 30. A straightforward but compute intensive search method is to visit every location in an image and assess the match value at each location so-visited. However, search strategies can be used that reduce computation time, without sacrificing search effectiveness. To arrive at an optimized search strategy, a model response surface is computed wherein every location in an image is visited, and the match value is computed at each location so-visited. To achieve rotation and scale invariance, the model response surface is generated by exhaustive application of the model over a finite four dimensional (x,y,angle,scale) space centered on the original point of extraction. Then, based on the size of the peaks found in the space, a search strategy is formulated that searches at a scale that will reasonably ensure that peaks will be found, i.e., the strategy searches coarsely enough to provide computational efficiency, but not so coarse that some valid peaks are not found. The step of extracting sample pixels 30 can affect the size of the peaks, and consequently can affect the search strategy. Therefore, it is useful to explore a variety of strategies for extracting sample pixels, which can differ according to the application, so that an optimum search strategy can be found.

At run-time, the model according to the invention can be used to search for a region in an image that is most similar to a scene from which the model was derived. The model can also be used for precise registration of the model with a region in an image. Additionally, the model can be used to provide a measure of similarity of a region in an image with the scene from which the model was derived.

To perform search or registration according to the invention, a similarity metric is calculated at a plurality of positions in an image to determine a position or positions where the similarity metric is the highest, is among the highest, and/or is above a threshold, depending on the application.

Figure 8:
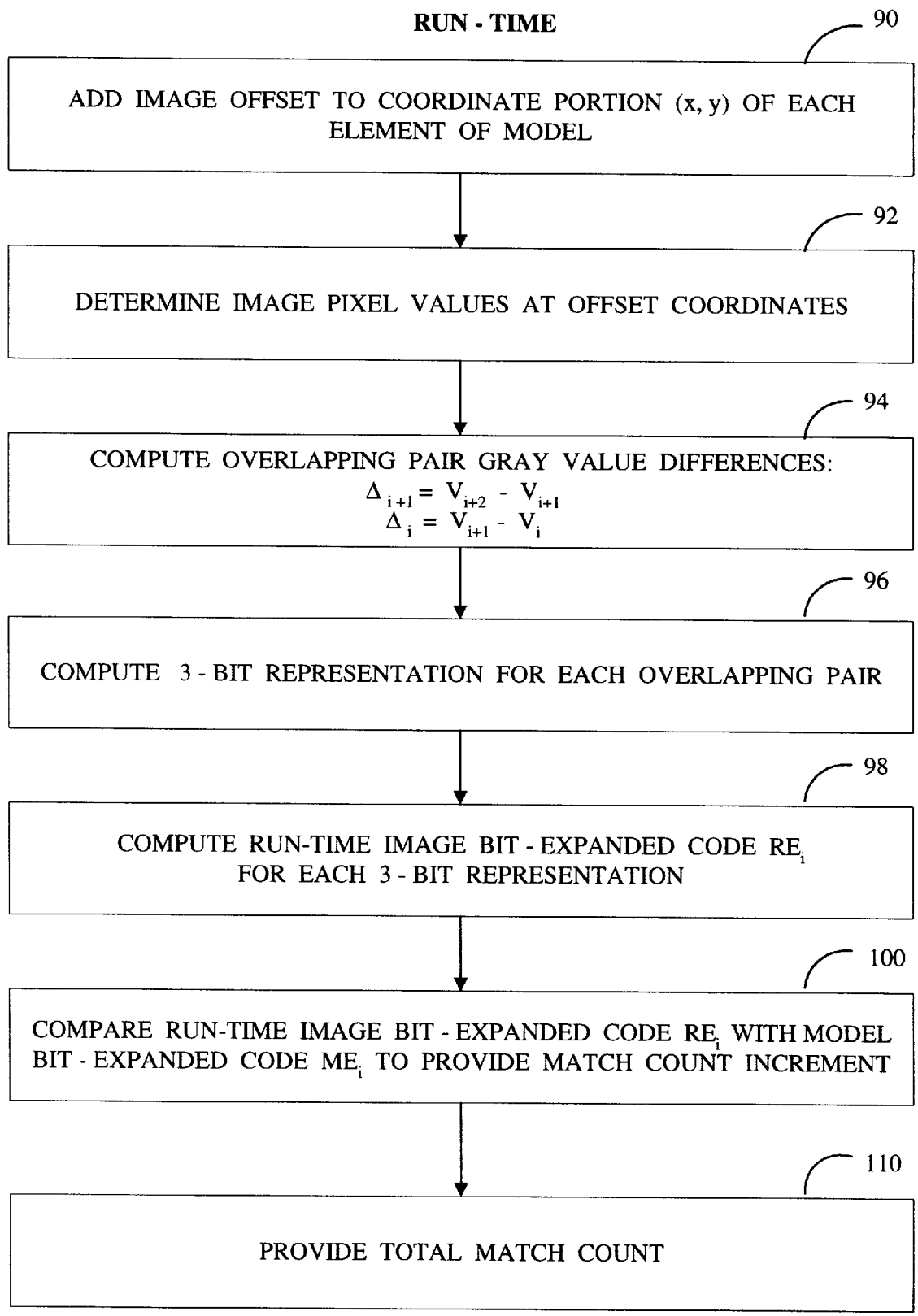
FIG. 8 is a flow chart showing the steps performed at run-time to provide a total match count using the model and the similarity metric according to the invention.

Referring to FIG. 8, to calculate the similarity metric of the invention at a position in a run-time image, an offset transformation is performed 90 that can be simply an additive offset, i.e., a translation of the model with respect to the runtime image to be searched, registered, or compared. The offset transformation can also include rotation and scale transformations of the model with respect to the run-time image. The rotation portion of the transformation requires the angular extent and center of rotation. After the transformation, run-time image pixels are acquired at the offset coordinates 92, including the $(x,y)_i$ position of each pixel, and its associated gray value $V_i$ to provide $(x,y,V)_i$.

Next, the run-time pixels are grouped into overlapping pairs 94 in accordance with the same sequence of pixels as the sequence of pixels of the model. For example, referring to FIG. 6, the resulting overlapping pairs are (1,2), (2,3), (3,4), (4,5), . . . Then, overlapping-pair gray value differences $\Delta_1$ and $\Delta_2$ are computed: $\Delta_1=V_2-V_1$, $\Delta_2=V_3-V_2$, and so forth, where $V_i$ is the gray value for the point having index i. One way that this can be accomplished is to compute the partial derivative of the sequence of localized gray values $(x,y,V)_i$ with respect to the index i of the localized gray values $(x,y,V)_i$.

Referring again to FIG. 8, we next compute a 3-bit representation of each overlapping pair 96. The first bit of the 3-bit representation is set to 1 if $\Delta_2$ is less than 0. Else, the first bit is set to 0. The second bit of the 3-bit representation is set to 1 if $\Delta_1$ is less than 0. Else, the second bit is set to 0. And the third bit of the 3-bit representation is set to 1 if $|\Delta_2|$ is greater than $|\Delta_1|$, else it is set to 0.

Referring to FIG. 7, the 3-bit representation can be interpreted as representing a phase angle, where the phase angle can assume one of eight values, each value being represented by a different 3-bit binary number. The phase angle is a feature of the image determined by the two overlapping pairs.

Next, a run-time image bit-expanded code $RE_i$ (R designates that this code is based on image data from the run-time image) is computed for each 3-bit binary number 98. In the case of a 3-bit binary number, an 8-bit expanded binary number is computed. For example, the binary number 101 becomes 0010000, the binary number 111 becomes 10000000, and the binary number 000 becomes 00000001.

Next, each run-time image bit-expanded code $RE_i$ is compared with a corresponding model bit-expanded code $ME_i$ so as to provide a match count increment 100. The total of all of the match count increments 110 is the total match count which is indicative of the quality or extent of the match between the model and the transformed portion of the run-time image to be compared with the model. The greater the total match count, the better the match between the model and the transformed portion of the run-time image. The total match count can be normalized using the normalizing information stored with the model so as to provide a total match count that falls between 0 and 100, for example.

To match each run-time image bit-expanded code with the corresponding model bit-expanded code, each bit of one of the bit-expanded code words is compared with the corresponding bit of the other bit-expanded code word by testing for equality to one. In one embodiment, for each bit of a bit-expanded code word, if both corresponding bits are equal to one, then provide a match count increment. Otherwise, do not provide a match count increment. In the terminology of binary logic, matching two bit-expanded codes is the same as computing the AND operator for each bit in the bit-expanded code, with the each pair of corresponding bits of the two bit-expanded codes as the operands.

In a preferred embodiment, a further condition must be satisfied in addition to the "both corresponding bits must be equal to one" condition to provide a match count increment. If $|\Delta_{i+1}|+|\Delta_i|$ is greater than a threshold, then provide a match count increment; else, do not provide a match count increment. This threshold defaults to one, but can be as great as six, depending on the application.

In a further preferred embodiment, an additional condition must be satisfied. To improve the signal-to-noise ratio, a "selectivity count" N is computed. The selectivity count N is defined to be the number of matches such that "both corresponding bits are equal to one" over the previous three values of the index i. For some applications, it is useful to require that N=1. For other applications, a more strict condition is applied, and it must be true that N=2, or N=3.

In another embodiment, as an additional condition, if the phase angle of the model bit-expanded code is 180 degrees out of phase with respect to the phase angle of the corresponding run-time image bit-expanded code, then a match count increment is subtracted.

Note that since the match condition consists of a plurality of add and compare operations, computation of the match condition, and the entire pattern similarity metric of the invention, can be efficiently computed in hardware.

To use the similarity metric of the invention for searching an image for the pattern or image selection of the model, a search space is first evaluated by computing the similarity metric at every position in the coarse search pattern, i.e., the search pattern that was found to be optimum for use in conjunction with the pixel extraction positions of step 30, FIG. 3, at train-time.

Then, local maxima in the search space are located and sorted in order of the magnitude of the similarity metric computed at the location of the maximum. Responses from the coarse search pattern are evaluated at higher resolution until either an expected number of unambiguous maxima has been identified, or the list of local maxima is exhausted.

To compute a value of a similarity metric for sub-pixel positions, the sum of absolute values of the differences in overlapping pairs of V: $\Sigma|V_{i+1}-V_i|$, for all i, where i is the model element index, is computed for each of nine points around each maximum so as to create an over-determined fit to a 3-D parabolic surface. The theoretical zero-crossing coordinate, i. e., the peak of the parabolic surface, is reported as the sub-pixel coordinate of the local maximum.

Other modifications and implementations will occur to those skilled in the art without departing from the spirit and the scope of the invention as claimed. Accordingly, the above description is not intended to limit the invention except as indicated in the following claims.

What is claimed is:

1. A method for comparing a model image with a run-time image so as to provide a quantitative measure of image similarity, the method comprising:

at train-time, extracting sample pixels of the model image so as to provide a pixel position and a gray value for each sample pixel of the model image;

computing gray value differences between overlapping pairs of sample pixels of the model image;

computing a compact binary representation for each overlapping pair;

computing an expanded binary representation for each compact binary representation;

associating a corresponding pixel position with each expanded binary representation to provide a model element; and grouping all model elements together to provide a model, and at run-time, determining gray values at a plurality of selected pixel locations in a run-time image in accordance with pixel positions of the elements of the model;

computing gray value differences between overlapping pairs of the selected pixels of the run-time image;

computing a compact binary representation for each overlapping pair of the selected pixels of the run-time image;

computing a run-time bit-expanded representation for each run-time compact binary representation;

comparing each run-time bit-expanded representation with a corresponding model bit-expanded representation to provide a match count increment; and combining all match count increments to provide a total match value.

2. The method of claim 1, wherein extracting sample pixels of the model image includes:

finding zero-crossings of the gray-scale second derivative of the model image.

3. The method of claim 1, wherein extracting sample pixels of the model image includes:

extracting sample pixels in a random pattern.

4. The method of claim 1, wherein extracting sample pixels of the model image includes:

extracting sample pixels in a biased random pattern.

5. The method of claim 1, wherein extracting sample pixels of the model image includes:

extracting sequences of sample pixels from alternating sides of a curve derived from the model image.

6. The method of claim 1, further comprising:

after computing the expanded binary representation for each compact binary representation, computing a perturbed expanded binary representation for each compact representation.

7. The method of claim 6, further comprising:

combining the perturbed expanded binary representation with the corresponding expanded binary representation.

8. The method of claim 1, further comprising:

associating a search strategy with the model.

9. The method of claim 1, further comprising:

associating normalizing information with the model.

10. The method of claim 1, wherein the step of determining gray values at a plurality of selected locations in a run-time image includes:

adding an image offset to the coordinate portion of each element of the model.

11. The method of claim 1, wherein the step of determining gray values at a plurality of selected locations in a run-time image includes:

transforming the coordinate portion of each element of the model, the selected locations in the run-time image being determined by the coordinates so-transformed.

12. The method of claim 1, wherein the train-time step of computing a compact binary representation includes computing a 3-bit representation.

13. The method of claim 1, wherein the run-time step of computing a compact binary representation includes computing a 3-bit representation.

14. The method of claim 1, wherein the step of comparing each run-time bit-expanded representation with a corresponding model bit-expanded representation to provide a match count increment includes:

for each bit of a bit-expanded code word, if both corresponding bits are equal to one, providing a match count increment, else, not providing a match count increment.

15. The method of claim 14, further including:

only when $|\Delta_{i+1}|+|\Delta_i|$ is greater than a threshold, providing a match count increment; else, not providing a match count increment.

16. The method of claim 15, wherein the threshold is equal to 1.

17. The method of claim 14, wherein a match count increment is provided only if the condition "both corresponding bits are equal to one" has been satisfied over at least one previous match of a run-time bit-expanded representation with a corresponding model bit-expanded representation.

18. The method of claim 14, further including:

subtracting a match count increment whenever the phase angle of the model bit-expanded code is 180 degrees out of phase with respect to the phase angle of the corresponding run-time image bit-expanded code.

19. A method for searching a run-time image with a model image so as to provide at least one location of the model image within the run-time image, the method comprising:

at train-time, extracting sample pixels of the model image so as to provide a pixel position and a gray value for each sample pixel of the model image;

computing gray value differences between overlapping pairs of sample pixels of the model image;

computing a compact binary representation for each overlapping pair;

computing an expanded binary representation for each compact binary representation;

associating a corresponding pixel position with each expanded binary representation to provide a model element; and grouping all model elements together to provide a model, and at run-time, determining gray values at a plurality of selected pixel locations in a run-time image in accordance with pixel positions of the elements of the model;

computing gray value differences between overlapping pairs of the selected pixels of the run-time image;

computing a compact binary representation for each overlapping pair of the selected pixels of the run-time image;

computing a run-time bit-expanded representation for each run-time compact binary representation;

comparing each run-time bit-expanded representation with a corresponding model bit-expanded representation to provide a match count increment;

combining all match count increments to provide a total match value;

determining a plurality of total match values at a plurality of positions in the run-time image to provide a total match value space; and evaluating the total match value space so as to find local maxima.

* * * * *